(12) United States Patent
Raghothaman et al.

(10) Patent No.: US 7,746,800 B2
(45) Date of Patent: Jun. 29, 2010

(54) FLEXIBLE RATE SPLIT METHOD FOR MIMO TRANSMISSION

(75) Inventors: Balaji Raghothaman, Allen, TX (US); Jianzhong Zhang, Irving, TX (US)

(73) Assignee: Nokia Corporation, Espoo (FI)

( * ) Notice: Subject to any disclaimer, the term of this patent is extended or adjusted under 35 U.S.C. 154(b) by 1898 days.

(21) Appl. No.: 10/718,837

(22) Filed: Nov. 21, 2003

(65) Prior Publication Data

US 2005/0111376 A1    May 26, 2005

(51) Int. Cl.
*G01R 31/08* (2006.01)
*H04B 7/14* (2006.01)

(52) U.S. Cl. ......................................... 370/252; 455/24

(58) Field of Classification Search ................. 370/252, 370/465–476, 249, 536, 542, 319–320, 342–344, 370/334–335, 339, 441–442, 479, 480; 455/101, 455/13.4, 19, 24, 103, 129
See application file for complete search history.

(56) References Cited

U.S. PATENT DOCUMENTS

| | | | | |
|---|---|---|---|---|
| 6,081,523 | A | 6/2000 | Merchant et al. | 370/389 |
| 6,510,133 | B1 | 1/2003 | Uesugi | 370/208 |
| 6,594,473 | B1 * | 7/2003 | Dabak et al. | 455/101 |
| 6,690,665 | B1 | 2/2004 | Choi et al. | 370/376 |
| 6,771,705 | B2 * | 8/2004 | Kenney et al. | 375/267 |
| 6,785,341 | B2 * | 8/2004 | Walton et al. | 375/267 |
| 6,961,388 | B2 * | 11/2005 | Ling et al. | 375/267 |
| 7,024,611 | B2 * | 4/2006 | Chen et al. | 714/751 |
| 7,277,407 | B2 * | 10/2007 | Kim et al. | 370/328 |
| 2002/0154705 | A1 * | 10/2002 | Walton et al. | 375/267 |
| 2003/0048856 | A1 * | 3/2003 | Ketchum et al. | 375/260 |
| 2003/0128769 | A1 * | 7/2003 | Kim et al. | 375/265 |

(Continued)

FOREIGN PATENT DOCUMENTS

WO    WO 02/47286 A2 *   6/2002

OTHER PUBLICATIONS

"Physical Layer Standard for cdma2000 Spread Spectrum Systems, Release C"; 3rd Generation Partnership Project 2 "3GPP2" C.S0002-C, Version 1.0; pp. 3-195 to 3-199; May 28, 2002.

(Continued)

*Primary Examiner*—Frank Duong
*Assistant Examiner*—Redentor M Pasia
(74) *Attorney, Agent, or Firm*—Harrington & Smith (57) ABSTRACT

A method for transmitting a packet of N input bits includes encoding all of the N bits as a single entity, such as with an interleaver of length N within a turbo coder, outputting M encoded bits, channel interleaving the M bits, splitting the M encoded bits into a parallel first and second portion, and transmitting them over separate channels to achieve spatial diversity. The size of the first and second portion is determined based on a closed feedback loop that provides some knowledge of the channel, preferably a measure of channel capacity. The feedback loop may also provide channel knowledge to a subpacket selector associated with each transmit antenna, which determines an appropriate rate for that channel and selects subpackets to fill a transmission packet for that channel. The subpacket selectors choose a subpacket of systematic bits and fill the remaining transmission packet size with subpackets of parity bits. Eigenvectors may be employed to transmit each transmission packet over more than one channel with a power disparity between the channels. A transmitter according to the present invention is also described.

24 Claims, 4 Drawing Sheets

U.S. PATENT DOCUMENTS

2004/0139383 A1* 7/2004 Salvi et al. .................. 714/759
2004/0202256 A1* 10/2004 Giannakis et al. ........... 375/267
2005/0025188 A1   2/2005 Numakura et al. .......... 370/490
2005/0053170 A1* 3/2005 Catreux et al. .............. 375/267

OTHER PUBLICATIONS

Kogiantis et al.; "MIMO Architecture Proposal for the F-PDCH"; Lucent Technologies; 7 pages, Dec. 6, 2001.

Chung et al.; "Approaching Eigenmode BLAST Channel Capacity Using V-BLAST with Rate and Power Feedback"; IEEE; 2001; pp. 915-919.

Soong et al.; "Forward High-Speed Wireless Packet Data Service in IS-2000—1xEV-DV[1]"; Ericsson Wireless Communications, Inc.; 15 pages.

* cited by examiner

FIG.2B
PRIOR ART
PER ANTENNA RATE CONTROL

FIG.3

FLEXIBLE RATE SPLIT METHOD FOR MIMO TRANSMISSION

FIELD OF THE INVENTION

The present invention relates to a multiple input/multiple output (IMO) communication system in which the transmitter has some knowledge of the channel parameters over which it transmits. It is particularly directed to dividing bits of an input packet into two streams based on the channel parameters, and transmitting those streams using the multiple antennas.

BACKGROUND

Modulated wireless signals from a transmitter reach a receiver by a number of propagation paths. The characteristics of each path vary over time and between one another due to factors such as fading, multipath, and different signal to interference and noise ratio (SINR). Multiple transmit and/or receive antennas may be used to provide diversity that insures against adverse effects on any of these paths, because the likelihood of correctly receiving a transmission increases with the number of transmit antennas so long as one propagation path is not merely a linear combination of the others. This diversity-oriented approach used space-time coding, and due to the emphasis on performance over capacity, included knowledge of channel distribution at the transmitter but typically not of channel quality. They are fully realizable with only one receiver antenna, and additional receiver antennas were simply used to add receiver diversity gain.

While multiple receive and/or multiple transmit antennas (multiple input/multiple output or MIMO) have been successfully employed to enhance diversity, they also allow a substantial increase in communication capacity as compared to non-MIMO systems. That increase is linearly related to the number of transmit or receive antennas. For a system utilizing T transmit antennas and R receive antennas, the MIMO channel may be considered as a number of C independent channels, where C is less than or equal to the lesser of T and R. Each of the C channels is also referred to as a spatial sub-channel of the overall MIMO channel, and corresponds to one dimension.

One approach to achieve that increased capacity utilizes layered space-time architecture, known as diagonal BLAST, delivers to each of the transmit antennas one of several streams of data that are space-time encoded. Diagonal BLAST presumes that the MIMO channel is Rayleigh fading and that the channel parameters are known at the receiver but not at the transmitter. Diagonal BLAST is therefore an open-loop approach. V-BLAST, which is a simpler implementation of diagonal BLAST, advocates a simple demultiplexing of the single data streams instead of some specific encoding in space-time. The corresponding receiver architecture for V-BLAST is also simpler. In general, the various BLAST approaches transmit at the same rate on each transmit antenna or antenna pair (depending upon feedback and spatial channel realization), and use a minimum mean square error linear transformation at the receiver followed by interference cancellation based on coded symbols. Because of its open loop approach, V-BLAST uses a simple demultiplexing of the symbols of the encoded packet over multiple antennas.

More recent approaches to achieving greater MIMO capacity rely upon the availability of some channel state information at the transmitter, a closed loop approach. One such approach is termed Per-Antenna Rate Control (PARC), wherein two or more transmit antennas are allotted variable transmit rates according to their respective channel conditions. Encoding is done separately on these two streams to achieve the different rates. Generally, the PARC approach inputs a data stream into a demultiplexer where it is split into several independent streams. Where a packet of size N is input into the demultiplexer, the corresponding outputs are then $N_1$ and $N_2$, where $N=N_1+N_2$. Each independent stream enters a turbo encoder where it is coded and interleaved across time. In a spread spectrum system, each of the $N_1$ and $N_2$ packets separately and independently undergo spreading, re-assembly, scrambling and transmission from one of the T antennas. Once divided at the multiplexer, the streams remain independent, so they are not encoded over space but only over time at the encoder. At the receiver, each sub-channel is received at one of the R receive antennas, where the signals are detected using a minimum mean square error algorithm. The antenna receiving the signal with the highest signal and interference to noise ration (SINR) is detected first, despread, multiplexed decoded, and collected. The decoded first signal is used to reconstruct the received signal, which is then subtracted from the remaining sub-channel that exhibits a lower SINR. Each of the signals are collected and multiplexed with one another.

In theory, the optimal approach for MIMO systems is to transmit multiple streams of data among several transmit antennas, where the encoding rate and power allocation of each stream is tailored to the channel quality over which the respective stream is be transmitted.

Researchers term this eigenmode or water-filling MIMO. Additionally, theory shows that the best MIMO performance may be achieved when each packet is jointly encoded and interleaved across the multiple channels. The present invention is directed to increasing capacity utilization within a MIMO system using some knowledge of channel quality or channel parameters at the transmitter.

SUMMARY OF THE INVENTION

The present invention improves upon the above prior art approaches by encoding the subpackets or streams across both space and time. The present invention does so in various embodiments by encoding an entire packet of size N before splitting it into subpackets, by determining the subpacket sizes, and also the number of systematic bits in each subpacket based on knowledge of the channel parameters, and by applying different powers and rates to the different channels over which the different subpackets are transmitted. Additionally, the present invention may use a single encoder of length N for encoding an entire packet of size N prior to dividing it into multiple streams that are sent over the different sub-channels, and may employ eigenvectors to transmit each of the streams over more than one channel at a power determined from knowledge of the channel quality.

Specifically, the present invention includes a method for transmitting a digital packet. The method includes encoding a packet of bits across time such as by an interleaver of length N for a packet of size N bits. The method includes determining a quality of at least a first channel from a feedback circuit. Preferably, the feedback circuit is the R-CQICH channel compliant with cdma2000 release C, but may be any circuit that provides a closed loop feedback of channel parameters. Preferably, the quality of the channel includes a measure of the channel capacity, and most preferably, the feedback circuit returns such quality measurements for each of the channels over which the packet of bits are to be transmitted. The encoded packet is divided into a first subpacket defining a first size and a second subpacket defining a second size that differs from the first size. The first size is based on the quality of the first channel as provided by the feedback circuit, and preferably all subpacket sizes are determined by feedback concerning all channels. The encoded subpackets are transmitted in parallel, the first subpacket from a first antenna at a first rate over the first channel, and the second subpacket from a second antenna at a second rate over a second channel.

The present invention also includes a transmitter that includes an encoder, a channel feedback circuit, a demultiplexer, a first amplifier, and first and second antennas. The transmitter may include more than two antennas. The encoder has an input for receiving a plurality of N bits, which may derive from a high rate input data stream. The size N may be determined based on channel quality feedback as allowed in the 1xEV-DV standard. The channel feedback circuit is used for determining a channel characteristic of a first communication channel, and preferably is used to determine such characteristics of all channels over which at least a portion of the N bits are to be transmitted. The demultiplexer has an input coupled to an output of the encoder, and an input coupled to an output of the channel feedback circuit. Preferably, these inputs to the demultiplexer are separate. The output of the encoder consists of M coded bits. The demultiplexer further has a first output for outputting a first portion of the encoded M bits, and a second output for outputting a second portion of the encoded M bits. The first and second outputs are in electrical parallel. Where the packet is to be transmitted over T transmit antennas, the demultiplexer includes T parallel outputs for outputting T subpackets. The amplifier is coupled to the first output of the demultiplexer for increasing a power of the first portion of the encoded M bits. The first antenna is also coupled to the first output for transmitting the first portion of the encoded N bits over the first communication channel, and the second antenna is coupled to the second output for transmitting the second portion of the encoded M bits over a second communication channel.

Using eigenvectors, both the first portion and the second portion may be transmitted over each of the first and second channels, or over as many T channels as are available. Eigenvector blocks associated with each output of the demultiplexer impose a power differential to the transmissions of their respective portions of bits over the differing channels. Preferably, the feedback circuit also outputs to a subpacket selector block associated with each output of the demultiplexer, so that the rate of transmission over each channel can be determined by selecting subpackets to fill a transmission packet whose size is determined, at least in part, by the feedback circuit. In practice, the rate cannot be maximized because many air interface standards, including cdma2000, release C, allow only certain packet sizes to be transmitted. In that instance, the transmission rate is determined in part by the channel quality and in part by the standard.

DETAILED DESCRIPTION

The present invention improves upon the prior art by encoding the streams across both space and time, and dividing the systematic bits among streams based on knowledge of the channel parameters. This knowledge may come from a receiver over an uplink channel, from measurement of the uplink channel by the receiver, or both. Other sources of channel quality measurement may also be employed. The present invention is compatible with the packet data channel (F-PDCH) of the 1xEV-DV standard, commonly known as cdma2000 release C, and described below. For a 1xEV-DV application, the uplink channel may be the reverse channel quality indicator channel (R-CQICH) or the reverse acknowledgement channel (R-ACKCH).

CDMA, or code-division multiple access, is a highly efficient use of radio spectrum based on a spread spectrum technique by which a narrow band voice or data signal is multiplied over a relatively wide band by a spreading code, generally termed a Walsh-Hadamard code or a Walsh code. In short, the narrow band signal is divided into "packets" that are each inserted into one or more "slots", each slot defined by time and frequency boundaries. The packets may be spread over the entire available bandwidth, so the initial narrow band signal is actually transmitted over a much wider bandwidth. A base station of a wireless service provider generally serves multiple users at once. While certain slots may be temporarily dedicated to one user or mobile station, other slots are available for use by other mobile stations. To meet the need for increasing data over available bandwidths (especially in the downlink or base station to mobile station direction), the 1xEV-DV standard has been introduced that allows wireless operators to utilize their spectrum more efficiently.

1xEV-DV introduces a number of new features to the air interface architecture. One key feature is higher forward link capacity to yield average forward data rates of up to 3.1 Mbps and average sector throughputs of about 1 Mbps. 1xEV-DV achieves these data rates though adaptive modulation coding schemes (AMC), hybrid automated repeat request (H-ARQ) to the physical frame layer, and by defining a new forward link data traffic channel called packet data channel (PDCH). PDCH provides both time-division multiplexing and code-division multiplexing treatments to data transmitted on it. PDCH is shared by packet data users and cannot undergo soft handoff (SHO). Depending upon system loading as determined by the individual wireless operator, the PDCH consists of one to twenty-eight code-division multiplexed quadrature Walsh sub-channels, each spread by a 32-ary Walsh function. It can transmit packets in fixed sizes of 408, 792, 1560, 2328, 3096, and 3864 bits, and the system has variable packet durations of 1.25, 2.5, and 5.0 milliseconds (ms). The various packet sizes allowed under 1xEV-DV enables MIMO equipment to communicate over various sub-channels at a higher capacity as compared to a single packet size and data rate (as in V-BLAST, described above). The 1xEV-DV standard affords the opportunity to send packets of various sizes (and therefore data rates) over the various MIMO sub-channels to maximize the capacity of each sub-channel. Each of the sub-channels (or frequency bins) is an independent spatial sub-channel.

Figure 1:
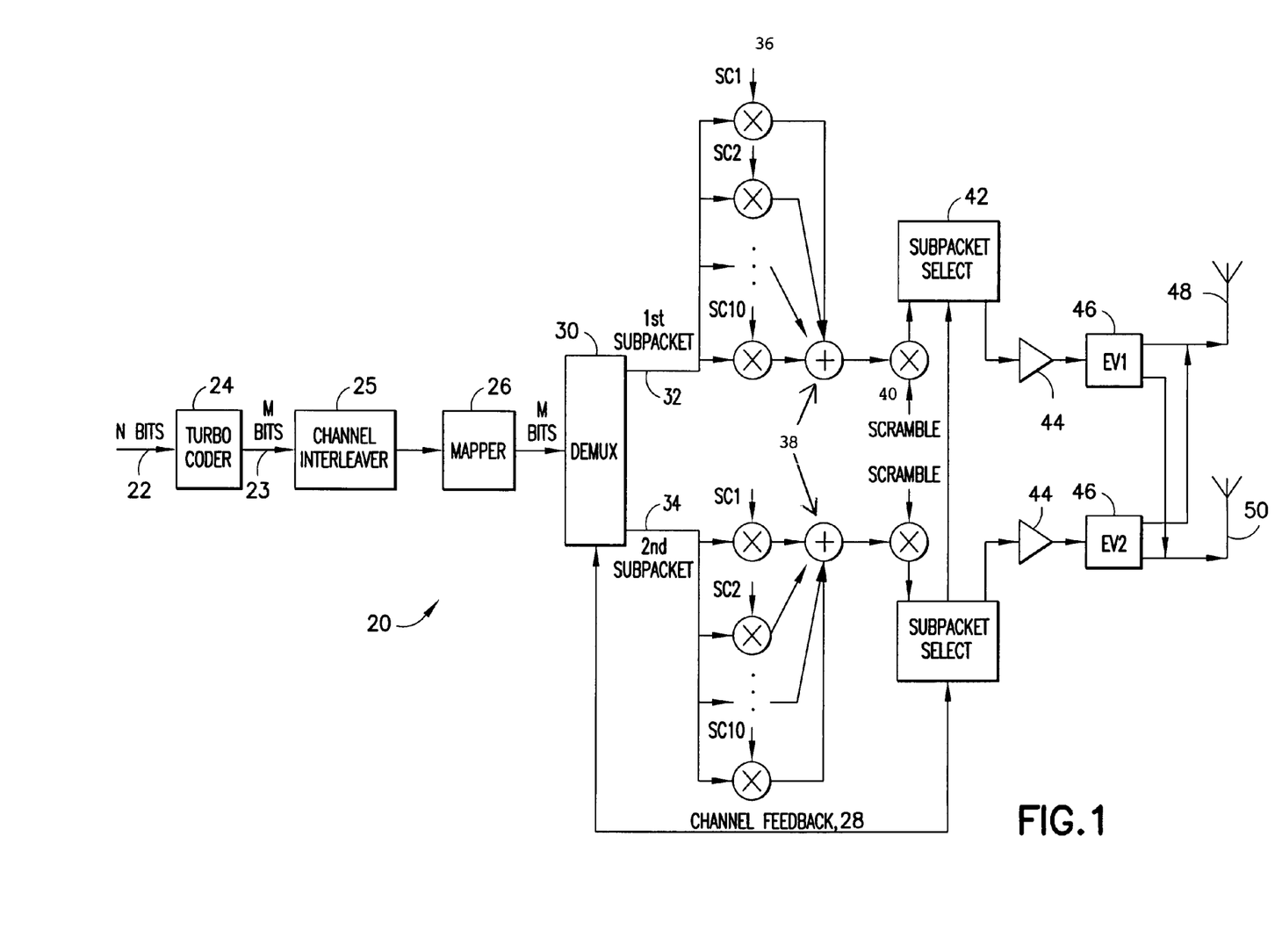
FIG. 1 is a block diagram showing a transmitter according to the preferred embodiment of the present invention.

FIG. 1 is a block diagram showing a transmitter 20 according to the preferred embodiment of the present invention. An initial packet of N bits, or a stream of N bits, is input into a turbo encoder 24, which outputs an encoded packet of size M bits, where M is greater than N. Of the M encoded bits output from the turbo encoder 24, the encoded packet includes N systematic bits, which are essentially the informational bits, and an assortment of M-N parity bits P0, P0', P1, and P1'. The 1xEV-DV standard provides that packet size into the turbo encoder 24 may be determined based on feedback from the R-CQICH, and the present invention is compatible with such an input. The encoded packet is encoded over time, and then interleaved at a channel interleaver 25 and mapped to constellation symbols at a constellation mapper 26. Because the present invention inputs the initial packet of N bits into a single turbo encoder 24 (as opposed to splitting the N bits into separate blocks that are input into parallel turbo coders), it enables the initial packet of size N to be interleaved as a whole at the interleaver within the turbo encoder 24. The interleaver (not separately shown) within the turbo encoder 24 is distinct from the channel interleaver 25. Where the undivided initial packet of size N is input into a single turbo encoder 24, the interleaver within the turbo encoder 24 has a length N. In contrast, the channel interleaver 25 has a length M, the number of bits output from the turbo encoder 24. The encoded, interleaved and mapped packet of size M is subdivided into two separate streams at a demultiplexer 30: a first stream along which a first subpacket 32 is output, and a parallel second stream along which the second subpacket 34 is output. Each of the original N input bits, and each of the M-N parity bits, is in only one of the first 32 and second 34 subpackets.

Channel characteristics vary across channels and across time, so it is advantageous that the data rate over each channel be allowed to vary within a single communication, such as within a single mobile call. Based on determined channel characteristics or some other knowledge of the channel, which may come from a receiver over an uplink channel such as R-CQICH or R-ACKCH, from measurement of the uplink channel at the transmitter 20, or by other means providing information on the feedback circuit 28, the transmission rate and power of each channel is determined. The determined capacity of at least one channel, and preferably all of them, is used to determine the maximum or optimum data rate that can be transmitted over a particular channel. That rate is then used to determine the appropriate sizes of the subpackets 32, 34. In this manner, the present invention improves over V-BLAST as described above in that the data rates vary across the channels due to the difference in packet size. While the description herein is directed to two transmit antennas and two subpackets 32, 34, the present invention is expandable to more than two as described below.

In a CDMA system, each of the encoded subpackets 32, 34, are split into k parallel streams, each of which is spread with a $k^{th}$ spreading code 36. Whereas FIG. 1 depicts a technique that re-uses the same spreading codes for different subpackets 32, 34 on different streams, other embodiments of the present invention need not re-use the same spreading codes on different streams. The various parallel streams are then recombined at an adder 38 and scrambled with a scrambling code 40 as known in the art. A subpacket select block 42 selects a subpacket to transmit based on the length of the frame, modulation, etc., a power level is applied at block 44, and the subpacket is transmitted over the first antenna 48. The power level is determined based on the channel parameters as described above to match the capacity of the channel over which the first antenna 48 transmits. The subpacket select block 42 preferably employs channel feedback only indirectly to determine which subpacket is next to transmit. Specifically, the subpacket select block 42 preferably selects subpackets or bits to fill a transmission packet size that is itself determined by knowledge of the channel. Where the air interface standard allows only certain packet sizes, as is typical, knowledge of the channel is used to select one of the allowed packet sizes.

Optionally, a weighting block 46 is imposed between the power block 42 and the transmit antenna for assigning power margins/adjustments according to eigenvectors or eigenvalues. For the first subpacket 32, a first power is applied at the power block 42 associated with the first stream and first subpacket 32 as described above. For two transmit antennas, the weighting block 46 assigns a first weight to the first subpacket 32 that is output to the first antenna 48, and a second weight to that same first subpacket 32 that is output to a second transmit antenna 50. Along the second stream, a second power is applied at its associated power block 42 to the second subpacket 34. The weighting block 46 associated with the second stream assigns a third weight to the second subpacket 34 that is output to the first antenna 48, and a fourth weight to that same second subpacket 34 that is output to the second transmit antenna 50. In this manner, even the subpackets 32, 34 are encoded over space. The weighting blocks 46 assign a complex number to their inputs rather than simply a real-valued multiplier of signal power. Regardless of the presence of the eigenvector weighting blocks 46, the original packet encoded at the turbo encoder 24 is spatially encoded because its two daughter subpackets 32, 34, are transmitted over different channels from different antennas 48, 50.

Figure 2A:
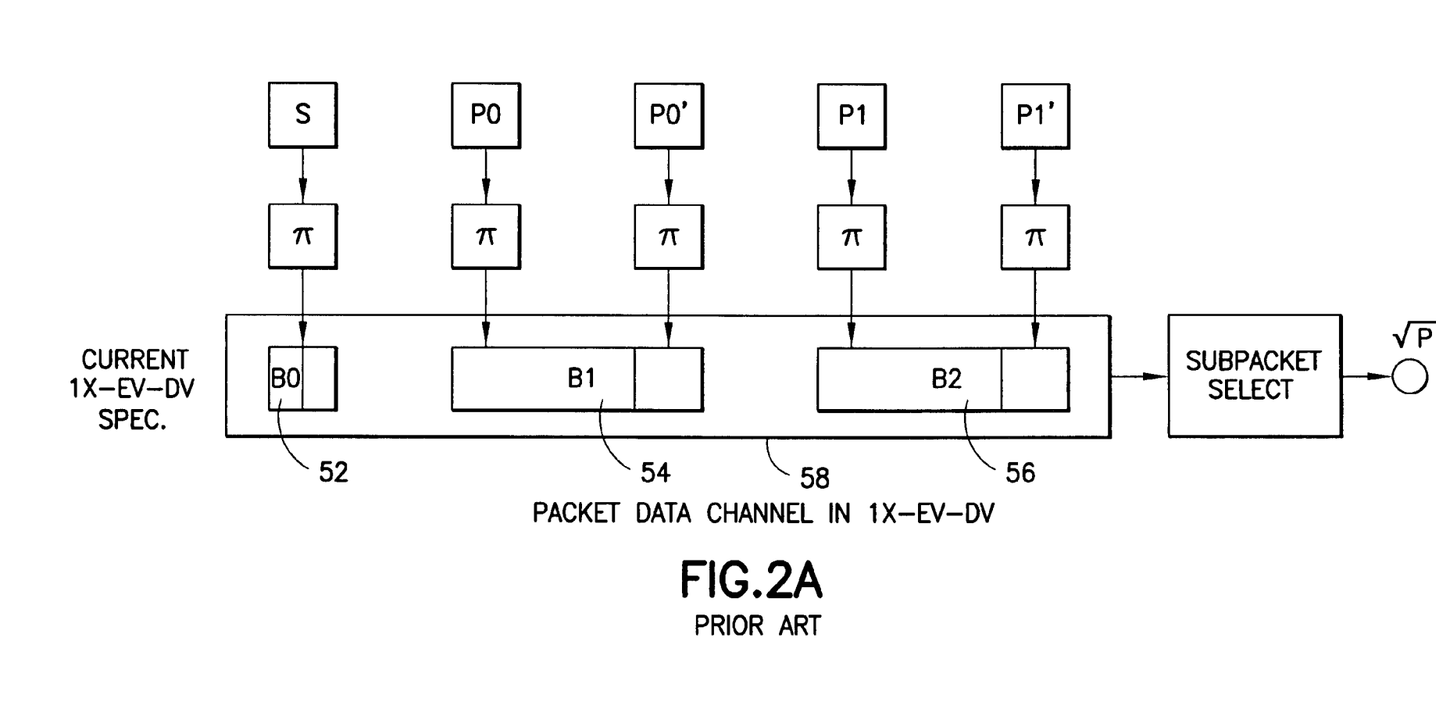
FIG. 2A is a prior art schematic diagram showing a packet transmission scheme according to the 1xEV-DV standard.

To better illustrate the present invention as compared to the prior art, FIG. 2A is a prior art block diagram showing a packet transmission scheme according to the 1xEV-DV standard. A series of N systematic bits (designated as S) and M-N parity bits (designated as P0, P0', P1, and P1') are input from an encoded high rate data stream and assembled into three blocks 52, 54, 56. A receiver such as a mobile station tracks changes in the channel quality and selects the optimal data rate at a maximum rate of once every 1.25 ms (fast link adaptation). However, the standard does not specifically provide for dividing the original input packet of size N and transmitting the portions at differing rates over disparate channels of a MIMO communication system. The standard provides that twenty-two bits are added to the 386, 770, 1538, 2306, 3074, or 3842 informational bits, encoded by a ⅕ turbo encoder, and the parity bits are bit-by-bit interleaved. The original packet, whether as a whole or as re-assembled sub-blocks of itself, is transmitted over one channel at a power determined by feedback over the R-CQICH.

Figure 2B:
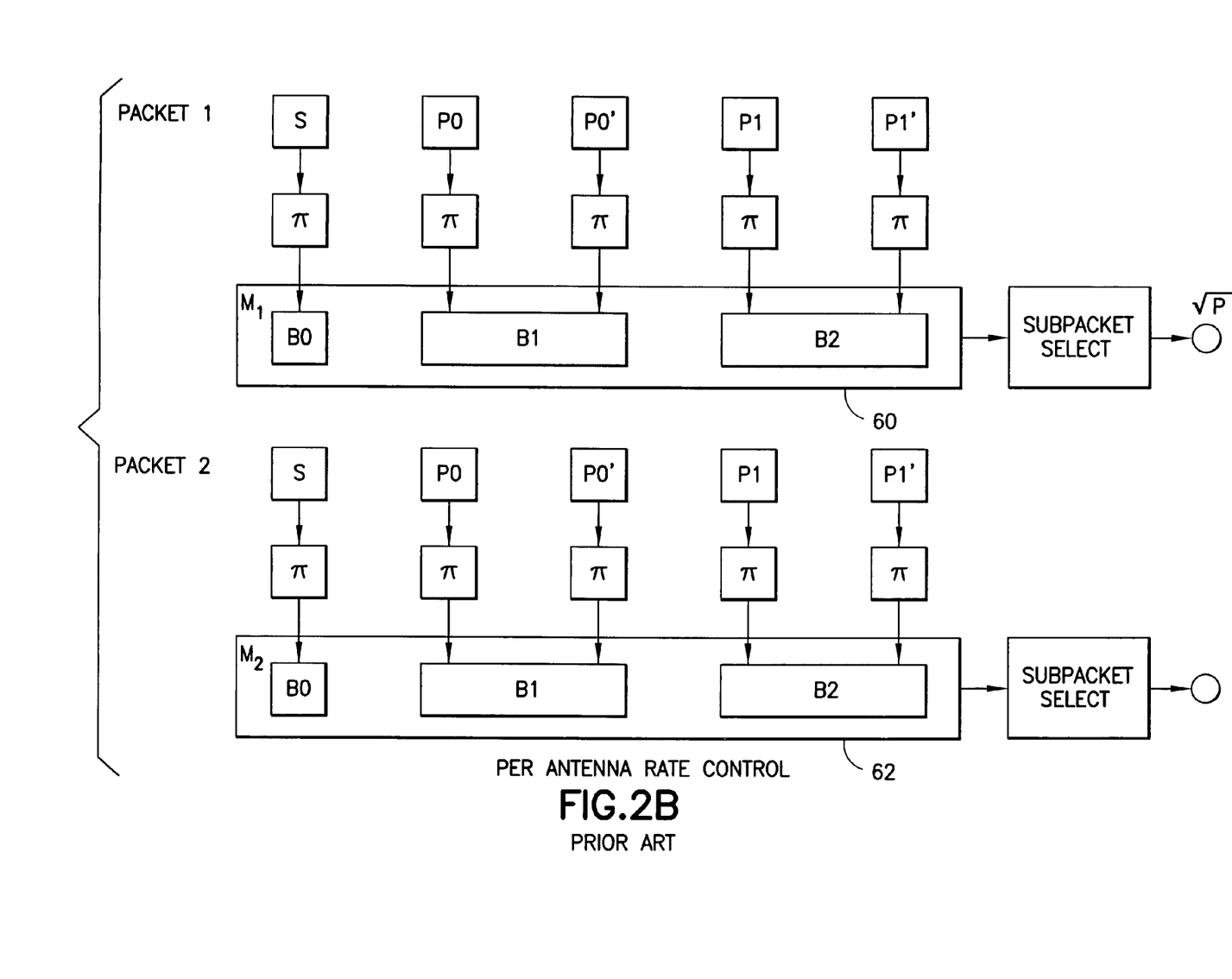
FIG. 2B is a prior art schematic diagram showing packet transmission according to the PARC method

FIG. 2B is similar to FIG. 2A but showing a prior art transmission scheme according to the PARC method described in the background section above. The PARC approach transmits two separate transmission packets 60, 62, each with a different packet size and modulation/coding scheme, over separate channels. A packet or stream of N systematic bits (designated S) is split into two blocks of sizes $N_1$ and $N_2$ (designated as B0 in the respective first 60 and second 62 transmission packets), where $N=N_1+N_2$. Each of the two blocks $N_1$ and $N_2$ are separately encoded by two turbo encoders in parallel. This results in two transmission packets 60, 62 of respective sizes $M_1=N_1+P_1$ and $M_2=N_2+P_2$, where $P_1$ and $P_2$ are the (non-zero) number of parity bits (designated as blocks B1 and B2). Each transmission packet 60 and 62 carries systematic bits and parity bits or only parity bits, and each is transmitted from one antenna at a power that may vary between channels, as determined by feedback over a closed loop. The PARC approach described above necessarily precludes interleaving of a packet (or portions thereof) associated with one channel (e.g., packet 60 carrying the $N_1$ bits) with a packet (or portions thereof) associated with another channel (e.g., packet 62 carrying the $N_2$ bits), and therefore does not encode the original N input bits over space.

In contrast, the flexible-rate split MIMO (FRS-MIMO) approach of the present invention encodes all of the input N bits, where $N=N_1+N_2$, into a single packet, and then distributes that encoded packet into two streams or portions that are then transmitted over separate sub-channels. An important aspect of the present invention is that it intelligently distributes the encoded packet into two or more substreams for MIMO transmission, based on some knowledge of the channel as provided by a feedback circuit 28 or mechanism such as the R-CQICH. In a preferred embodiment, the N systematic bits (designated S) that are originally input into the turbo encoder 24 are divided into two subpackets of different sizes $N_1$, $N_2$ after encoding. The M-N parity bits (designated P0, P0', P1, and P1') may or may not be divided in the same ratio as the systematic bits. A sub-packet selection algorithm then acts on these two streams to obtain a rate of transmission that depends from the channel parameters or channel quality. For the first packet transmission, this selection procedure consists simply of transmitting all of the systematic bits and then as many parity bits as necessary to fill the packet size that may be selected based on channel feedback (and within those packet sizes allowed by an air interface standard). The two streams have different rates commensurate with the channel over which each will be transmitted. The systematic bits are encoded and interleaved across space and time in the present invention. Also, the present invention is operable with an interleaver within the turbo encoder 24 of size N in a single turbo encoder. In contradistinction, the prior art uses multiple turbo interleavers of smaller sizes $N_1$ and $N_2$, since the original N information bits are split into blocks $N_1$ and $N_2$ prior to being encoded by separate turbo encoders in parallel. Since the size of the interleaver of a turbo encoder has a bearing on its performance, there is an additional gain associated with FRS-MIMO by employing one turbo encoder 24 with a comparatively larger interleaver.

Figure 3:
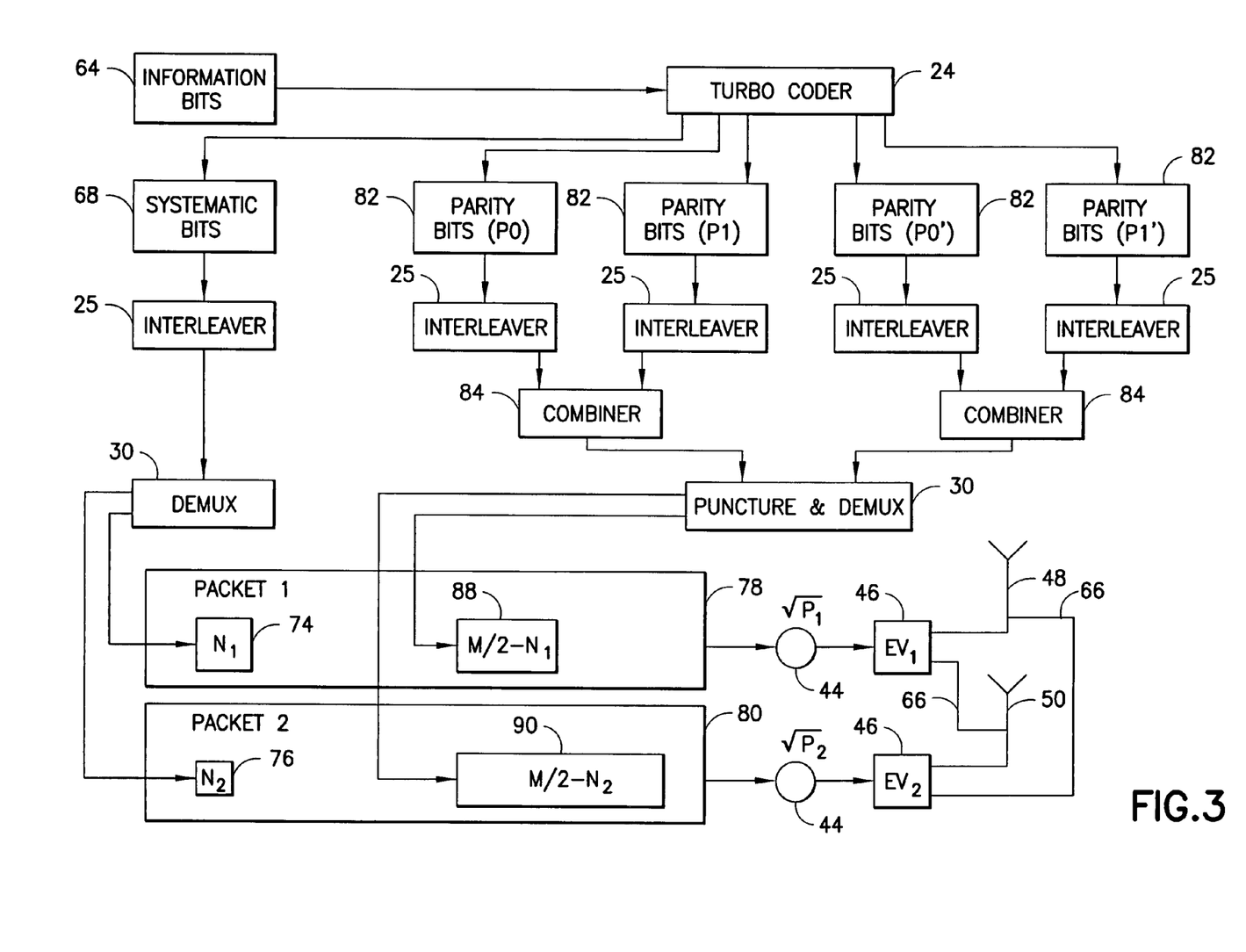
FIG. 3 is a schematic diagram showing subpacket assembly and packet transmission according to the present invention.

One embodiment of the present invention is detailed at FIG. 3 in block diagram form that better describes the function within portions of the diagram of FIG. 1. An input packet 64, having N bits, is input into the turbo encoder 24. These N bits are interleaved within the turbo encoder 24 over their entire length N. The output of the turbo encoder is M bits, consisting of the original N informational bits (termed systematic bits) and various parity bits (P0, P0', P1, and P1'). Treatment of the different types of bits is shown separately in FIG. 3, but illustrate different functional aspects of the invention rather than different hardware components of a transmitter. The systematic bits 68 are interleaved at the channel interleaver 25, demultiplexed at the demultiplexer 30, and divided into two subpackets 74, 76 of size $N_1$ and $N_2$ respectively. Through the subpacket select blocks 42 described with reference to FIG. 1, the first systematic bit subpacket 74 of size $N_1$ becomes part of a first transmission packet 78, and the second systematic bit subpacket 76 of size $N_2$ becomes part of a second transmission packet 80. The parity bits 82 are preferably divided into four groups according to type (P0, P0', P1, and P1'), interleaved at the channel interleaver 25, and combined 84 into as many channels as are available to the transmitter (two in FIG. 3). The 1xEV-DV standard describes the four parity bit types, though division of parity bits by type is not necessary to the broader aspects of the present invention. The combined parity bits are demultiplexed and punctured at the demultiplexer 30, and divided into parity bit subpackets 88, 90 that are put into the transmission packets 78, 80 with the systematic bit subpackets 74, 76. Assuming a total number of bits $M=M_1+M_2$ (the M bits output from the turbo encoder 24) are transmitted by both transmission packets 78, 80 in combination, the first parity bit subpacket 88 includes ($M_1-N_1$) bits and the first transmission packet 78 carries $M_1$ bits. The second parity bit subpacket 90 includes ($M_2-N_2$) bits and the second transmission packet 80 carries $M_2$ bits. Where $M_1=M_2=M/2$ (as depicted in FIG. 3), the packet sizes and transmission rates are the same even where $N_1 \neq N_2$, and only the power and weight may vary between channels as described above with reference to the power blocks 44 and weighting blocks 46. Where $M_1 \neq M_2$, the transmission rate as well as power and weight may vary between the channels. Even without the eigenvector weighting blocks 46 and their associated cross feeds 66 to opposing antennas 48, 50, the original input packet 64 is spatially encoded because each of the transmission packets 78, 80 carry interleaved bits from the original packet 64.

For the two examples immediately below, consider a transmission wherein the packet consists of N information bits that are encoded into M bits, the M encoded bits are divided into transmission packets of equal size M/2, and the separate transmission packets are transmitted over two channels. As one example of subpacket size selection, if the feedback mechanism indicates that a first channel has twice the capacity of a second channel, the original packet, of size N information bits or systematic bits encoded into M coded bits, may be split in such a way that, the first subpacket consists of 2N/3 and (M/2−2N/3) parity bits to be transmitted over the first channel, and the second subpacket consists of N/3 systematic bits and (M/2−N/3) parity bits to be transmitted over the second channel.

As another example, if the feedback mechanism indicates that the first channel has more capacity than the second channel, then the packet may be transmitted such that all N systematic bits, along with (M/2−N) parity bits, are transmitted over the first channel (provided N<M/2), and M/2 parity bits are transmitted over the second channel.

Preferably, a combination of transmission rate and subpacket size is used to account for excess capacity in the first channel as compared to the second (per the examples above), since both rate and subpacket size are determined from knowledge of the channel quality. In this manner, data rates over all available channels can be optimized given the relative capacities of each channel as determined by whatever closed loop feedback mechanism is employed.

Transmission of the subpackets $N_1$ and $N_2$ can take the following several forms:

The two streams can be transmitted across two antennas, with a power imbalance. The stream carrying more information bits (hence higher rate) is assigned more power, while the stream carrying lesser information is assigned lesser power, while conforming to an overall total power constraint.

The two streams can be transmitted over two eigenmodes across multiple antennas. This entails the transmission of both streams over all the antennas, with suitable weighting. Here the number of transmitter antennas can be greater than two.

In the above examples and subpacket forms, the number of transmission packets and streams may be increased up to the number of transmission antennas and channels available for transmission. Several strategies can be used to divide the power and rate between the two streams. One such technique is based on the resultant capacity of the transmission. Assume two streams are transmitted with powers $P_1$ and $P_2$ respectively from two antennas, and that the MIMO transmission is received by two receiver antennas. Assume further that the flat channel vector (a matrix from the frequency selective fading channels) emanating from the first antenna is given by h1 and from the second antenna by $h_2$. An additive Gaussian noise has a variance $\sigma^2$. Then, the capacities of the first and second streams are given by the following:

$$C_1 = \log(1 + P_1 h_1^H (P_2 h_2 h_2^H + \sigma^2 I)^{-1} h_1),$$

$$C_2 = \log(1 + P_2 h_2^H (P_1 h_1 h_1^H + \sigma^2 I)^{-1} h_2)$$

Using Lagrangian maximization with a total power constraint, the powers $P_1$ and $P_2$ can be determined, and hence the rates associated with them. This approach is specific to embodiments wherein eigenvectors are not used. Though this assumption is not always true, it enables a straightforward way of performing the power split, and it was adopted in the link-level simulations that are summarized below.

Other methods of allocating power and rate include, for example, minimizing the average expected probability of error given the channel conditions. Power can be similarly calculated for more than two antennas similar to the approach described above. Specifically, the first (highest power) stream is detected first, the second stream (next highest power) is detected and the first stream is canceled from it, then the third stream (next highest power) is detected and the first and second streams are cancelled from the third stream, etc. This continues for each of the multiple streams for each successively lower-powered channel.

The FRS-MIMO approach offers at least two distinct advantages over the prior art as discussed above:

In FRS-MIMO, the packet is encoded and interleaved across both space and time. This ensures that different portions of the packet encounter different channels, even when there is quasistatic fading. Encoding across space and time ensures broader diversity than either method individually, and reduces error rates.

The packet of size N is encoded as one entity rather than two smaller packets. Hence the interleaver in the turbo-encoder may be longer and provide more gain than a plurality of smaller interleavers acting on only a portion of the input packet of size N.

Additionally, the FRS-MIMO approach allows for an advanced iterative decoder/receiver structure. The inventors have performed link level simulation to demonstrate the FRS-MIMO approach and to quantify results. Packets of 1560 information bits were processed using the current 1x-EV-DV packet data channel framework for encoding. Flat quasistatic fading channels were generated for a 2-transmit by 2-receive antenna configuration. In a system level simulation, the packet size is not restricted to a single quantity, but can rather vary as noted above with fast adaptation. The size of the packet will be a function of the total channel quality. However, the inventors believe that the performance advantage demonstrated in those simulations, where packet size was fixed, will persist in more elaborate simulations where packet sizes vary in accordance with 1xEV-DV.

Two receiver structures were used:

A. Max-SINR, no successive cancellation:

The receivers for the two streams are given by:

$$w_1 = (P_2 h_2 h_2^H + \sigma^2 I)^{-1} h_1,$$

$$w_2 = (P_1 h_1 h_1^H + \sigma^2 I)^{-1} h_2$$

where $h_1$, $h_2$ are the vectors depicting the channels emanating from the first and second transmit antenna, respectively; $P_1$ and $P_2$ are the powers of the two streams; and $\sigma^2$ is the variance of the noise, modeled as AWGN.

B. Max-SINR for stronger stream+ideal cancellation of the first stream while detecting the second:

In this method, the first stream is detected using the receiver $w_1$ as above. The second stream is detected after canceling the interference from the first. In practice, the detected symbols of the first stream must be used in order to perform this cancellation. Thus any errors in detecting the first stream propagate to the cancellation process and to calculating other streams. In the inventors' simulations, the cancellation is idealized in that, for the purposes of the cancellation, the first stream is assumed to have been received perfectly. In both cases (no successive cancellation and ideal successive cancellation), FRS-MIMO outperformed both PARC and V-BLAST, except at certain SNR values where FRS-MIMO exhibits a slightly higher BLER. The usage of eigenvectors in addition to rate and power splitting was not modeled in those simulations, but can be expected to further improve the performance of FRS-MIMO.

While there has been illustrated and described what is considered to be a preferred embodiment of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method comprising:
    encoding, at an encoder, a plurality of N systematic bits across time and space into an encoded packet of size M bits, wherein encoding the plurality of N systematic bits comprises interleaving the plurality of N systematic bits;
    determining a quality of at least a first channel from a feedback circuit;
    channel interleaving the plurality of N systematic bits and parity bits corresponding to the N systematic bits;
    dividing the encoded packet into a first transmission packet defining a first size $M_1$ bits that includes $N_1$ of the N systematic bits and a second transmission packet defining a second size $M_2$ bits that includes $N_2$ of the N systematic bits, wherein at least one of $M_1$ and $N_1$ is based on the determined quality of the first channel; and
    transmitting in parallel the first transmission packet from a first antenna at a first rate at a first power modified by a first weight value over the first channel and the second transmission packet from a second antenna at a second rate that differs from the first rate and at the first power modified by a second weight value over a second channel, wherein M, $M_1$, $M_2$, N, $N_1$ and $N_2$ are all integers, M is greater than N, M is at least equal to $M_1+M_2$, and N is at least equal to $N_1+N_2$.

2. The method of claim 1 wherein dividing the encoded packet comprises maximizing a number $N_1$ of systematic bits in the first transmission packet.

3. The method of claim 2 wherein $N=N_1$ and $N_2=0$.

4. The method of claim 1 wherein $M_1=M_2$ and $N_1 \neq N_2$.

5. The method of claim 1 wherein transmitting further comprises:
    transmitting the second transmission packet from the second antenna over the second channel at a second power modified by a third weight value, and from the first antenna over the first channel at the second power modified by a fourth weight value.

6. The method of claim 1 wherein encoding a plurality of N systematic bits across time into an encoded packet of size M bits comprises interleaving over the M bits.

7. The method of claim 6 wherein encoding further comprises turbo encoding using a single turbo interleaver of size N prior to interleaving over the M bits.

8. The method of claim 1 wherein determining a quality of at least a first channel comprises determining a capacity of said first channel.

9. The method of claim 1 wherein determining a quality of at least a first channel comprises determining a quality of a second channel, and the values of $M_1$ and $M_2$ are determined from the quality of the first and second channels.

10. The method of claim 1, further comprising:
channel interleaving the encoded packet of size M bits with other encoded packets; and wherein dividing the encoded packet is after the channel interleaving.

11. A device comprising:
an encoder having an input configured to receive a plurality of N systematic bits and an output configured to output a plurality of M bits, wherein M is greater than N, wherein the encoder is configured to encode the N systematic bits over time and to interleave the N systematic bits over space;
a channel feedback circuit configured to determine a channel characteristic of a first communication channel;
a demultiplexer having an input configured to receive an output of the channel feedback circuit, said demultiplexer configured to output in parallel a first portion $M_1$ of the M bits at a first output and a second portion $M_2$ of the M bits at a second output;
a channel interleaver disposed between the encoder and the demultiplexer and configured to channel interleave the N systematic bits and parity bits corresponding to the N systematic bits and provide the channel interleaved N systematic bits and parity bits to the demultiplexer;
a first amplifier configured to increase a power of said first portion $M_1$ of the M bits to a first power prior to transmission from said first antenna;
a first antenna configured to transmit, at a first rate, said first portion $M_1$ of the M bits;
a second amplifier configured to increase a power of said second portion $M_2$ of the M bits to a second power prior to transmission from said second antenna; and
a second antenna configured to transmit, at a second rate that differs from the first rate, said second portion $M_2$ of the M bits; and
a first eigenvector block in series with the first output, said first eigenvector block configured to apply a first power weight factor to said first portion $M_1$ of the M bits prior to transmission from said first antenna and configured to apply a second power weight factor to said first portion $M_1$ of the M bits prior to transmission from said second antenna.

12. The device of claim 11 wherein said first and second power weight factor are based on at least one of a size of said first $M_1$ and second $M_2$ portion and a channel quality of a first and second channel is provided by said channel feedback circuit, said first antenna configured to transmit over said first channel and said second antenna configured to transmit over said second channel.

13. The device of claim 11 further comprising:
a second eigenvector block in series with the second output, said second eigenvector block configured to apply a third weight factor to said second portion $M_2$ of the M bits prior to transmission from said second antenna and configured to apply a fourth power weight factor to said second portion $M_2$ of the M bits prior to transmission from said first antenna.

14. The device of claim 13 wherein said third and fourth power weight factors are based on at least one of a size of said first $M_1$ and second $M_2$ portion and a channel quality of a first and second channel provided by said channel feedback circuit, said first antenna configured to transmit over said first channel and said second antenna configured to transmit over said second channel.

15. The device of claim 11 wherein said encoder comprises an interleaver of length N, the transmitter further comprising a channel interleaver of length M configured to receive the output of the encoder.

16. The device of claim 11 wherein the first $M_1$ and second $M_2$ portion are the same size and the systematic bits are not equally distributed among the first $M_1$ and second $M_2$ portion.

17. The device of claim 11 wherein said demultiplexer is configured to operate to maximize a number of systematic bits in the first portion $M_1$.

18. The device of claim 11 further comprising a first subpacket selector configured to receive the first output of the demultiplexer, configured to receive an output of the feedback circuit, and configured to provide a signal to the first antenna, said first subpacket selector configured to select and combine, into a first transmission packet that is transmitted over the first channel, the first portion $M_1$ and at least one additional subpacket from the first output of the demultiplexer, wherein a size of said first transmission packet is determined at least in part based on the output of channel feedback circuit.

19. The apparatus of claim 18 wherein the at least one additional subpacket comprises only parity bits.

20. The device of claim 11, wherein the further comprising a channel interleaver disposed between the encoder and the demultiplexer and configured to channel interleave the encoded packet of size M bits with other encoded packets.

21. A method comprising:
encoding a plurality of input bits across time and space;
based on a determined characteristic of at least a first channel, adaptively splitting the encoded input bits into a first subpacket defining a first subpacket size and a second subpacket defining a second subpacket size; and
transmitting the first subpacket at a first rate and at a first power over the first channel and the second subpacket at a second rate that differs from the first rate and at a second power that differs from the first power over a second channel, wherein the first and second powers are determined using Lagrangian maximization with a total power constraint.

22. The method of claim 21, further comprising channel interleaving the encoded input bits with other encoded packets prior to adaptively splitting the encoded input bits.

23. An apparatus comprising:
an encoder configured to encode a plurality of input bits over time and to interleave the input bits over space;
a demultiplexer configured to adaptively split the encoded plurality of bits into a first subpacket defining a first subpacket size and a second subpacket defining a second subpacket size;
a channel interleaver disposed between the encoder and the demultiplexer and configured to channel interleave the plurality of input bits and parity bits corresponding to the plurality of input bits;
a first antenna configured to transmit the first subpacket at a first rate and at a first power over a first channel; and
a second antenna configured to transmit the second subpacket at a second rate that differs from the first rate and at a second power that differs from the first power over a second channel, wherein the first and second powers are determined using Lagrangian maximization with a total power constraint.

24. The apparatus of claim 23 further comprising:
a channel feedback circuit configured to provide a channel characteristic of at least the first channel by which the demultiplexer adaptively splits the encoded plurality of bits.

* * * * *